US011867954B2

(12) United States Patent
Rochat (10) Patent No.: US 11,867,954 B2
(45) Date of Patent: Jan. 9, 2024

(54) SECTION AND ASSEMBLY COMPRISING A PLURALITY OF SUCH SECTIONS

(71) Applicant: OMNISENS SA, Morges (CH)

(72) Inventor: Etienne Rochat, Valey res sous Ursins (CH)

(73) Assignee: OMNISENS SA, Morges (CH)

( * ) Notice: Subject to any disclaimer, the term of this patent is extended or adjusted under 35 U.S.C. 154(b) by 0 days.

(21) Appl. No.: 17/907,651

(22) PCT Filed: Apr. 10, 2020

(86) PCT No.: PCT/EP2020/060320
§ 371 (c)(1),
(2) Date: Sep. 28, 2022

(87) PCT Pub. No.: WO2021/204403
PCT Pub. Date: Oct. 14, 2021

(65) Prior Publication Data
US 2023/0141958 A1 May 11, 2023

(51) Int. Cl.
*G02B 6/38* (2006.01)
*G02B 6/44* (2006.01)

(52) U.S. Cl.
CPC ............ *G02B 6/389* (2013.01); *G02B 6/4427* (2013.01)

(58) Field of Classification Search
CPC .............................. G02B 6/389; G02B 6/4427
See application file for complete search history.

(56) References Cited

U.S. PATENT DOCUMENTS

| 4,733,935 A | 3/1988 | Gandy |
| 4,785,139 A | 11/1988 | Lynch et al. |
| 5,189,725 A | 2/1993 | Bensel, III et al. |
| 6,571,042 B1 * | 5/2003 | Kordahi ............... G02B 6/4461 |
| | | 385/100 |
| 2020/0057220 A1 | 2/2020 | Hull et al. |

OTHER PUBLICATIONS

International Search Report and Written Opinion received for PCT/EP2020/060320, dated Dec. 22, 2020.

* cited by examiner

*Primary Examiner* — Sung H Pak
(74) *Attorney, Agent, or Firm* — Greer, Burns & Crain, Ltd (57) ABSTRACT

An assembly assembled by a plurality of sections put together, wherein the section includes
an elongated structure having a left end and a right end,
an optical fiber having a left end and a right end and extending from its left end to its right end so that:
the left ends of the elongated structure and of the optical fiber are located on the same left side of the section, and
the right ends of the elongated structure and of the optical fiber are located on the same right side of the section,
each end of the optical fiber is enclosed in a junction box, the box of the right or left end of the optical fiber of the section being assembled with the junction box of the left end or right end of the optical fiber of another similar section to optically connect the optical fibers of two sections.

21 Claims, 7 Drawing Sheets

SECTION AND ASSEMBLY COMPRISING A PLURALITY OF SUCH SECTIONS

BACKGROUND

The present invention relates to a section and an assembly comprising a plurality of sections put together, such as pipelines.

Pipes portion are elongated structures, which can be positioned in harsh environment such as under water.

The integrity of an assembly of such sections of pipe portions is usually monitored by optical fibers extending along the assembly of these sections, each section comprising an optical fiber and a junction box. In that case, when the pipe portion is arranged to be positioned under water, junction boxes with optical fibers are assembled in situ of the location of pipe portion before being put in the water. This assembly of the optical fibers is functional regarding the goal of the application but raises different problems regarding:
- the easiness of the assembly in harsh environment because all the assemblies are carried out in situ of the location of the pipe portion,
- the time spent to assemble the optical fibers in the junction box and in the pipe portion, and
- the control of the assembly.

An aim of the invention is to overcome at least one of the drawbacks and limits of the prior art, and in particular to present a section:
- easiest to assemble with another section and not time consuming, and/or
- more effective in term of the optimization of the operation used for the assembly.

SUMMARY

A first aspect of the invention concerns a section for an assembly, said assembly being arranged to be assembled by a plurality of sections put together, wherein said section comprises:
- an elongated structure having a left end and a right end,
- an optical fiber, preferably surrounding the elongated structure, said optical fiber having a left end and a right end and extending from its left end to its right end in such a way that:
  - the left end of the elongated structure and the left end of the optical fiber are located on the same left side of the section, and
  - the right end of the elongated structure and the right end of the optical fiber are located on the same right side of the section.

Each end of the optical fiber is enclosed in a junction box, the junction box of the respectively right end or left end of the optical fiber of this section being arranged to be assembled with the junction box of the respectively left end or right end of the optical fiber of another similar section in order to allow an optical connection between the optical fibers of two sections.

On the left end of the optical fiber and/or on the right end of the optical fiber, the optical fiber inside the junction box according to the invention may be surrounded by less layer(s) than outside the junction box or by other layer(s) than outside the junction box.

On the left end of the optical fiber and/or on the right end of the optical fiber, the at least one layer, surrounding the optical fiber outside the junction box of an assembly according to the invention but not inside the junction box may be connected both to the junction box and to the respectively left end or right end of the section.

The junction box, of an assembly according to the invention, of the respectively right end or left end of the optical fiber may be arranged to be connected and locked to a junction box of the respectively left end or right end of the optical fiber of the other similar section of an assembly.

The section according to the invention may comprise, for each junction box, a decoupling means arranged to decouple pulling force on the assembly of the elongated structure of this section and on the junction box from the optical fiber.

The at least one layer surrounding the optical fiber outside the junction box according to the invention may be connected and integrated with the junction box thanks to the decoupling means.

The decoupling means according to the invention may comprise:
- a decoupling structure comprising at least one tube-shaped part, preferably one metallic tube-shaped part, and means for screwing the decoupling structure to the junction box, the decoupling structure that may be positioned between:
  - the at least one layer surrounding the optical fiber outside the junction box, and
  - the optical fiber so that:
    - the decoupling structure may be surrounded by the at least one layer surrounding the optical fiber outside the junction box and
    - the optical fiber may be surrounded by the decoupling structure, and
- connection means surrounding at least one part of the decoupling structure and the at least one layer surrounding the optical fiber outside the junction box, the connection means that may be fixed on the decoupling structure thanks to the means for screwing, the connection means that may be arranged to grip the at least one layer on the decoupling structure.

At least one end of the optical fiber according to the invention, preferably each end of the fiber:
- may be equipped with an optical connector, and/or
- may be separated in two channels by a coupler, preferably by a wavelength division multiplexing coupler.

A removable cover or plug may be positioned on each junction box according to the invention and fixed to its junction box, said removable cover or plug being arranged to close or seal the inside of the junction box, the removable cover or plug being arranged to be removed before assembling two junction boxes together.

A second aspect of the invention concerns an assembly comprising a plurality of assembled sections according to the first aspect of the invention.

Two assembled junction boxes according to the invention may be:
- covered by a protection cover positioned above the two assembled junction boxes and
- fixed to the protection cover.

Said protection cover that may be arranged to close or to seal the inside of the two assembled junction boxes from the outside of the two assembled junction boxes.

Two assembled junction boxes according to the invention, placed at a connection of a first section and a second section, may be covered by a protection housing covering and insulating from the outside of the protection housing:
- the entire connection of two connected ends of the connected sections and
- the two assembled junction boxes, said protection housing may comprise a top portion and a bottom portion, said top and bottom portions may comprise:
  a left end fixed at a right side of the first section of the assembly, and
  a right end fixed at a left side of the second section of the assembly.

Another aspect of the invention concerns a process of assembling a plurality of sections according to the invention, that can comprise the following steps:
  connecting the left end of elongated structure of a second section to the right end of the elongated structure of a first section,
  connecting or assembling the junction box enclosing the left end of the optical fiber of the second section to the junction box enclosing the right end of another optical fiber of the first section so as to form two assembled junction boxes.

The process according to the invention may comprise:
fixing the two assembled junction boxes with securing means.

The process according to the invention may comprise:
removing the removable cover or plug positioned on each junction box before connecting or assembling the two junction boxes together.

The process according to the invention may comprise:
connecting together, inside the two assembled junction boxes, the two ends of the two optical fibers of two connected sections.

The process according to the invention may comprise:
connecting together, by splicing inside the two assembled junction boxes, the two ends of two optical fibers of two connected sections, or
connecting an optical connector to at least one free end of the optical fiber of the first section or of the second section comprised in an unassembled junction box to another junction box.

The process according to the invention may comprise:
controlling the optical connection between two optical fibers connected inside two assembled junction boxes by connecting an optical control means to the free end of the optical fiber of the first section or of the second section comprised in an unassembled junction box to another junction box.

The process according to the invention may comprise:
connecting a coupler to the left end of the optical fiber of the second section or to the right end of the optical fiber of the first section in order to separate the end of this separated optical fiber in first and second channels;
connecting an optical control means to the first channel of the separated fiber, and, preferably in the same time;
connecting the second channel of the separated fiber to an end of the other optical fiber.

The process according to the invention may comprise:
positioning and fixing, by securing means, a protection cover on the two assembled junction boxes.

The process according to the invention may further comprise:
  positioning a protection housing, in order to cover and insulate from the outside of the protection housing:
  the entire connection of the two connected ends of the connected sections and
  the two assembled junction boxes,
  fixing a left end of the protection housing at a right side of the first section of the assembly, and
  fixing a right end of the protection housing at a left side of the second section of the assembly.

BRIEF DESCRIPTION OF THE DRAWINGS

Other advantages and characteristics of the invention will appear upon examination of the detailed description of embodiments, which are in no way limitative, and of the appended drawings in which.

In the description, the terms "first", "second" are used as an illustration and are not limitative. They can be reversed.

In the description, the terms "left", "right" are used as an illustration and are not limitative. They can be reversed.

DETAILED DESCRIPTION

These embodiments being in no way limitative, we can consider variants of the invention including only a selection of characteristics subsequently described or illustrated, isolated from other described or illustrated characteristics (even if this selection is taken from a sentence containing these other characteristics), if this selection of characteristics is sufficient to give a technical advantage or to distinguish the invention over the state of the art. This selection includes at least one characteristic, preferably a functional characteristic without structural details, or with only a part of the structural details if that part is sufficient to give a technical advantage or to distinguish the invention over the state of the art.

Figure 1:
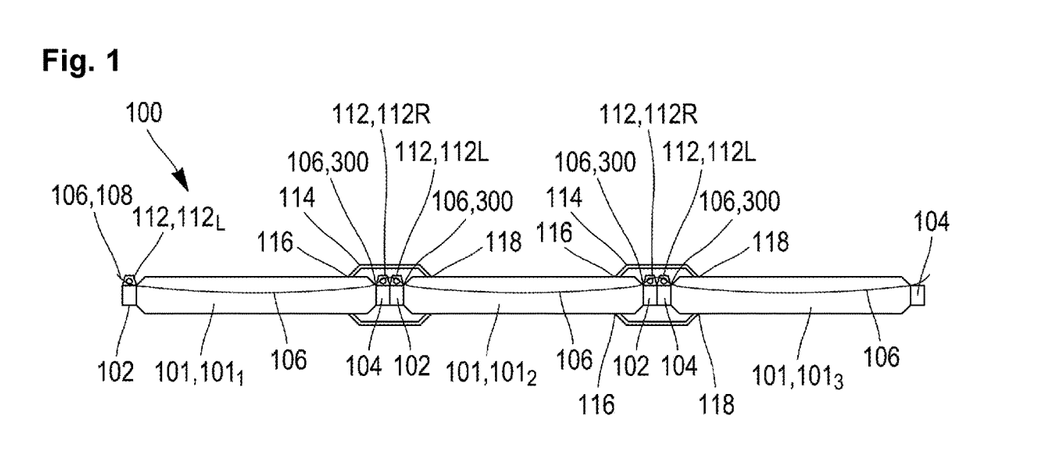
FIG. 1 schematically shows an elongated assembly, such as pipe portions put together and equipped with junction boxes according to the invention.

We are now going to describe an assembly 100 according to the invention in reference to FIG. 1.

In the following description, if the word "the" is used for describing an element existing in several copies (for example "the optical fiber", "the section", "the junction box", etc.) it can generally be understood as "each" (respectively for example "each optical fiber of the assembly", "each section of the assembly", "each junction box of the assembly", etc.), or it can be understood as a description of this element for a section 101 or for an end of a section 101 that can be generalized to all the other sections 101 or all the ends of all sections 101.

FIG. 1 schematically shows an assembly 100, for example, an elongated assembly 100 being arranged to be assembled by a plurality of sections 101 put together, such as pipe portions 101 put together.

The assembly 100 comprising a plurality of assembled sections 101.

The assembly 100 comprises a plurality of sections 101 positioned successively one behind the other according to a longitudinal direction.

Each section 101 comprises an elongated structure having a left end 102 and a right end 104.

For example, the left end 102 of the elongated structure of a second section $101_2$ is arranged to be connected and locked with the right end 104 of the elongated structure of another similar section $101_1$ positioned before the second section $101_2$.

Two successively following sections are assembled at the level of their ends.

In addition, each section 101 comprises:
- an optical fiber 106, said optical fiber 106 having a left end 108 and a right end 110 and extending from its left end 108 to its right end 110 in such a way that:
  - the left end 102 of the elongated structure and the left end 108 of the optical fiber 106 are located on the same left side of the section 101, and
  - the right end 104 of the elongated structure and the right end 110 of the optical fiber 106 are located on the same right side of the section 101.

Thus, if a section 101 extends along the longitudinal direction, the optical fiber 106 of this section 101 extends along the same longitudinal direction; typically, this fiber 106 extends:
- linearly in the longitudinal direction, i.e. it remains substantially always on the same side around the section 101, or
- while surrounding the section 101, for example by extending helically around the section 101 and along the longitudinal direction.

Each end 108, 110 of the optical fiber 106 is enclosed in a junction box 112. The junction box 112 of the respectively right end 110 or left end 108 of the optical fiber 106 of this section is arranged to be assembled with the junction box 112 of the respectively left end 108 or right end 110 of the optical fiber 106 of another similar section 101. This allows an optical connection between the optical fibers 106 of the two sections 101 positioned successively behind each other.

The assembly of two sections $101_1$ and $101_2$ is faster and less time consuming.

For example, in FIG. 1, the junction box $112_L$ associated with the second section $101_2$ is connected with the junction box $112_R$ associated of the first section $101_1$, said first section $101_1$ being positioned before the second section $101_2$ according to the longitudinal direction.

In FIG. 1 the optical fiber 106 of each section 101 extends across the section 101 along the entire length (i.e. along the longitudinal direction) of the structure 101. In FIG. 1, the optical fiber 106 of each section 101 is inside an inner part (not specifically shown in the drawing) of the section 101.

The optical fibers 106 can be different or identical.

In the case illustrated in FIG. 1, all optical fibers 106 are identical.

In a variant, not shown, the optical fiber 106 surrounds an inner shell of the elongated structure of the section 101.

The junction box 112 of the respectively right end 110 or the left end 108 of the optical fiber 106 is arranged to be connected and locked to a junction box 112 of the respectively left end 108 or right end 110 of the optical fiber 106 of the other similar section of the assembly 100. Other similar section means a section connected to the left end 102 of the considered section 101 or to the right end 104 the considered section 101.

In FIG. 1, the junction box 112 of each section 101 is assembled and locked with a junction box 112 of another similar section 101. By that way, there is an optical connection between the optical fibers 106 of the two assembled sections 101.

Optical connection means that the optical fibers 106 of the two assembled sections 101 are arranged for a circulation of light between the different assembled sections 101 of FIG. 1, i.e. a circulation of light between the different connected optical fibers 106. Circulation can be seen as a transmission and/or a propagation of light between the different assembled sections 101 of FIG. 1.

The optical connection between the optical fibers 106 of the two assembled sections 101 is carried out inside the junction box 112, preferably by splicing the two ends of each optical fiber 106 of the two junction boxes 112 arranged to be assembled together.

The optical fiber 106 of each section 101 is assembled with two junction boxes $112_L$, $112_R$ at its ends 110, 108.

For example, for the second section $101_2$,
- the left end 108 of the optical fiber 106 (of the section $101_2$) is assembled with a first junction box $112_L$ positioned in the left end 102 of the section $101_2$, and
- the right end 110 of the optical fiber 106 (of the section $101_2$) is assembled with a second junction box $112_R$ positioned at the right end 104 of the section $101_2$.

At the level of the junction of the two different sections $101_1$, $101_2$, the two assembled junction boxes $112_L$, $112_R$, placed at a connection of the second section $101_2$ with the first section $101_1$, are covered by a protection housing 114.

The protection housing 114 is like a sheath 114, which protects the elements positioned at a junction of two sections 101.

The protection housing 114 at the level of a junction between section $101_1$ and $101_2$ comprises a top portion and a bottom portion, said top and bottom portions comprising:
- a left end 116 fixed at a right side of the first section $101_1$ of the assembly 100, and
- a right end 118 fixed at a left side of the second section $101_2$ of the assembly 100.

The protection housing is for example two half cylinders arranged to be attached to two sides of two sections 101.

The protection housing 114 covers and protects from the outside of the protection housing 114 (especially from water, from dust) the different elements positioned inside the protection housing 114, such as:
- the entire connection of the two connected ends 102, 104 of the connected sections $101_1$ and $101_2$, and
- the two assembled junction boxes $112_L$, $112_R$ of the two sections $101_1$, $101_2$ (or $101_2$-$101_3$),
- a portion of the sections $101_1$-$101_2$ (or $101_2$-$101_3$) and a portion of the optical fiber 106 surrounded by layers 300 (disclosed in FIG. 3A to FIG. 3D) covered by the protection housing 114.
- It means that the protection housing 114 offers mechanical protection from impact as well as protection from water, dust etc.

The protection housing 114 is made of heat-resistance material, typically same material as the section 101, for instance stainless steel, or aluminum or even polymer.

Figures 2A, 2B:
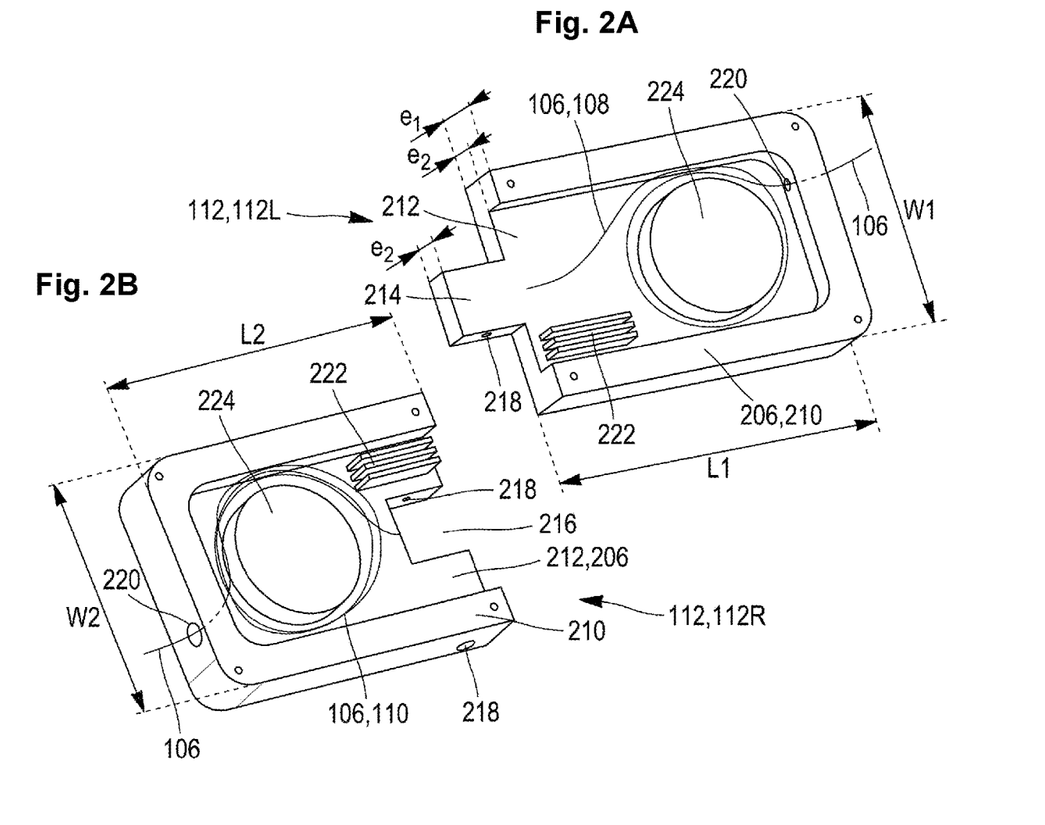
FIGS. 2A and 2B schematically show two junction boxes according to the invention.

We are now going to describe two junction boxes $112_L$, $112_R$ according to the invention arranged to be assembled together.

The two junction boxes 112 are specifically an example of two junction boxes $112_L$ and $112_R$ arranged to be assembled at the level of a connection of two sections $101_1$ and $101_2$ illustrated in FIG. 1.

For example, on the one hand, the junction box 112 illustrated in FIG. 2A is the junction box $112_L$ of the left end 102 of the elongated structure of the second section $101_2$.

On the other hand, the junction box 112 illustrated in FIG. 2B is the junction box $112_R$ of right end 104 of the elongated structure of the first section $101_1$.

However, this example is just an illustration, because as said previously, the optical fiber 106 and/or a section 101 is assembled with two junction boxes $112_R$ and $112_L$ at its ends. These two junction boxes $112_R$ and $112_L$ can be reversed. By that situation, the junction box $112_L$ illustrated in FIG. 2A can be the junction box $112_R$ of right end 104 of the elongated structure of a section 101 and the junction box $112_R$ illustrated in FIG. 2B can be the junction box 112 of left end 102 of the elongated structure of a section 101.

Figure 4:
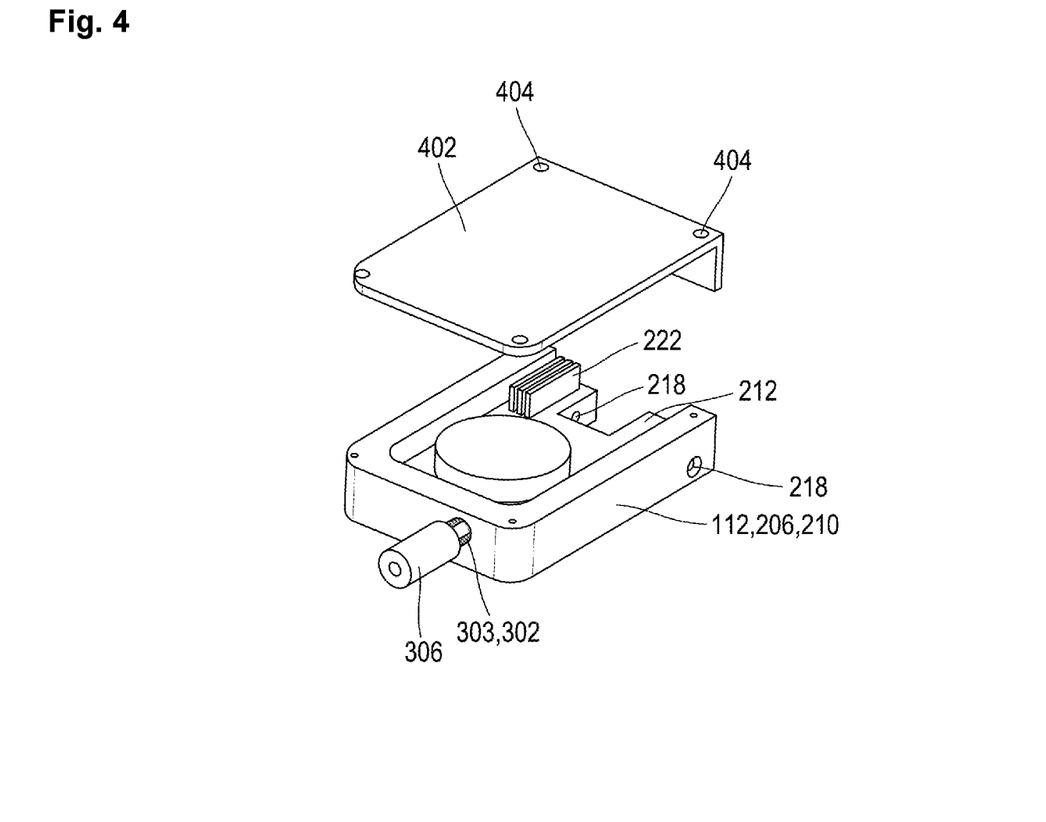
FIG. 4 shows a junction box according to the invention with a removable cover or plug before being assembled with another junction box according to the invention.
Figure 7A:
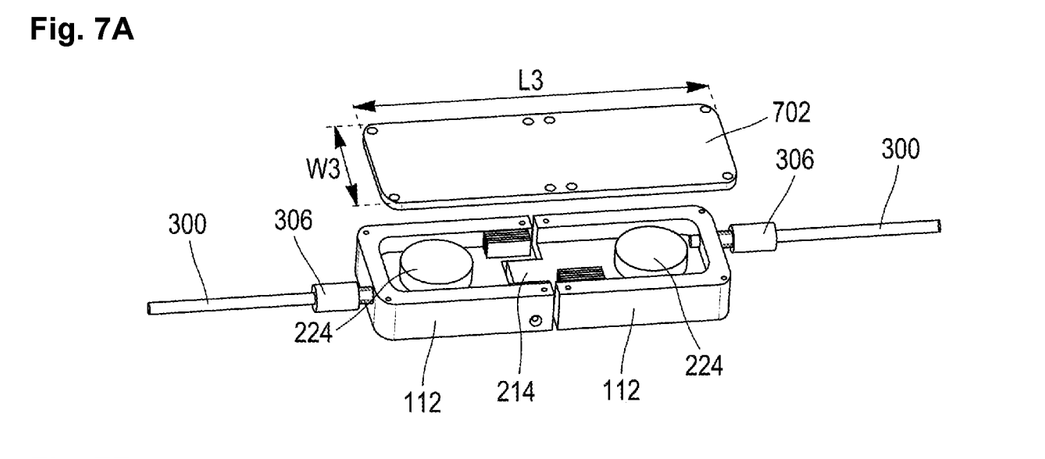
FIG. 7A shows the assembly of two junction boxes according to the invention.
Figure 7B:
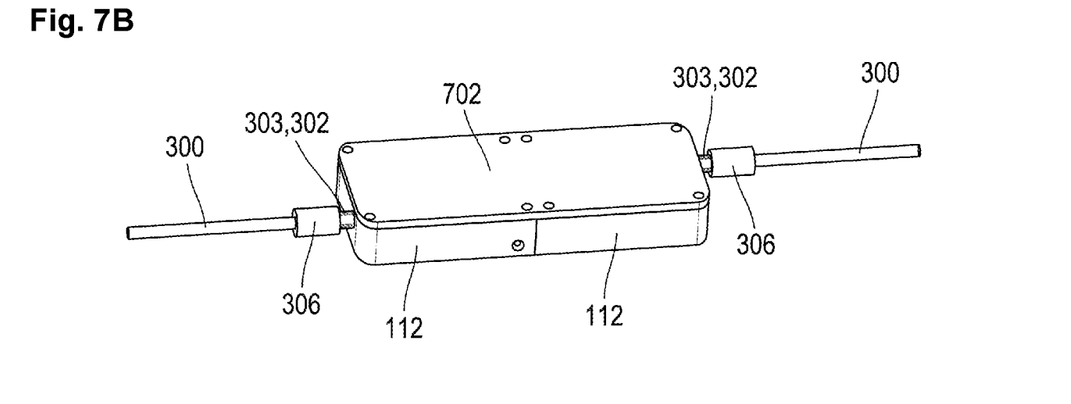
FIG. 7B shows two junction boxes assembled according to the invention.

The junction boxes $112_R$, $112_L$ comprise a stand 206 arranged to receive the optical fiber 106 and a removable cover 402 or plug 402 shown in FIG. 4 and a protection cover 702 shown in FIG. 7A and FIG. 7B. The cover 402 or plug 402 is arranged to be secured to the stand 206 of each the junction boxes $112_R$, $112_L$. The protection cover 702 is arranged to be secured to the stand 206 of two assembled junction boxes $112_L$, $112_R$.

The stand 206 has an elongated shape, for example a rectangular shape. The stand 206 is relatively thin.

For example, the stand 206 of the junction box $112_L$ has a length L1 typically 1.5 times longer than its width w1. Preferably, the length L1 of the stand 206 the junction box $112_L$ is about of 105 mm and the width w1 is about of 70 mm.

For example, the stand 206 of the junction box $112_R$ has a length L2 at least 1.5 times longer than its width w2.

In FIG. 2A and FIG. 2B, the stands 206 of the junction box $112_R$ and $112_L$ are of same width. In addition, the length L1 of the junction box $112_L$ can be different from the length L2 of the junction box $112_R$.

As illustrated in FIG. 2, the length L1 of the junction box $112_L$ is equal to the length L2 of the junction box $112_R$.

The stand 206 comprises an outer part 210 and an inner part 212. The outer part 210 is arranged to receive the removable cover 402 or plug 402 shown in FIG. 4 and the protection cover 702 shown in FIG. 7A and FIG. 7B, all arranged to be secured to the stand 206 of the junction box 112.

The outer part 210 is thicker than the inner part 212 of the stand 206. For example, the outer part 210 of the stand 206 is at least two time thicker than the inner part 212 of the stand 206. Preferably, the outer part 210 has a thickness e1 about 20 mm and the inner part 212 has a thickness e2 about 10 mm.

On the one hand, the inner part 212 of the junction box $112_L$ illustrated in FIG. 2A comprises a first protrusion 214. On the other hand, the inner part 212 of the junction box $112_R$ illustrated in FIG. 2B comprises a first cavity 216.

The first protrusion 214 of a junction box $112_L$ of the second section $101_2$ is arranged to be assembled and/or locked in the first cavity 216 of another junction box $112_R$ of another section 101, for example, with the junction box $112_R$ of the first section $101_1$. To lock the first protrusion 214 of a junction box $112_L$ with the first cavity 216 of another junction box $112_R$, the first protrusion 214 has to be assembled in the first cavity 216 and locked with means for securing (not shown) the first protrusion 214 with the first cavity 216. The securing means can be, for example, a screw or a pin.

For doing that, the two junction boxes $112_L$, $112_R$, arranged to be assembled together, comprise at least:
one first hole 218 positioned in a side of the first protrusion 214 such that the first hole 218 extends in the first protrusion 214 along a longitudinal direction of the width w1 of the stand 206, and/or
one first hole 218 extending along the entire longitudinal direction of the width w1 of the stand 206. In that case, the at least one first hole 218 extends across the outer part 210 and the inner part 212 of the longitudinal direction of the width w1 of the stand 206.

The junction box $112_L$ comprising the first protrusion 214 comprises a first hole 218 extending along the entire width of the first protrusion 214.

The junction box $112_R$ comprising the first cavity 216 comprises first two holes 218 positioned on both sides of the first cavity widthwise w2 of the junction box $112_R$.

If a screw is used to assemble the two assembled junction boxes $112_L$, $112_R$, then one of the two holes 118 of the junction box $112_R$ having the cavity 216 is threaded. In addition, the hole 218 of the junction box $112_L$ having the protrusion 214 is threated.

The junction box 112 comprises at least one second hole 220 arranged to pass the optical fiber 106 inside the junction box 112.

The junction box 112 comprises a comb 222 arranged to trap the two ends of the optical fibers 106 after being spliced together.

A shrink-sleeves (not shown) is used to protect the two ends of the optical fibers 106 spliced together.

Another way could be to use a recoating at the two ends of the optical fibers 106 spliced together.

In all case, the comb 222 is adapted to accept the two ends of the optical fibers 106 spliced together with their shrink-sleeves or recoating.

As shown in FIG. 2A and FIG. 2B, the two junction boxes $112_L$ and $112_R$ comprise each a comb 222. The two combs provide flexibility for coiling and/or splicing the optical fibers 116.

The stand 206 is made of the same material as the junction box 112, for instance stainless steel, or aluminum or even polymer.

The stand 206 comprises a part 224 forming a guide wall used for the optical fiber 106 winding inside the stand 206, specifically inside the inner part 212 of the stand 206.

The thickness of the part 224 is thinner than the thickness e1 of the outer part 210 of the stand 206.

The upper side of the part 224 is below the upper side of the junction box 112 on which a removable cover or plug 402 and/or a protection housing 702 will be arranged.

Inside the two junction boxes $112_L$, $112_R$, the cladding of the optical fiber 106 surrounds the optical fiber 106.

But, for each junction box 112, a part of the optical fiber 106, its left end 108 and/or right end 110 is naked in order to be spliced with another optical fiber 106 of another junction box 112 arranged to be assembled with this junction box 112.

Specifically, the cladding of at least one end of the optical fiber 106 has been removed to a specified length in order to splice two ends of two optical fibers 106.

We are now going to describe a junction box 112 according to the invention arranged to be clamped to an end of a section 101, such as at the end of a pipe portion, in reference to FIG. 3A, FIG. 3B, FIG. 3C and FIG. 3D.

Figure 3A:
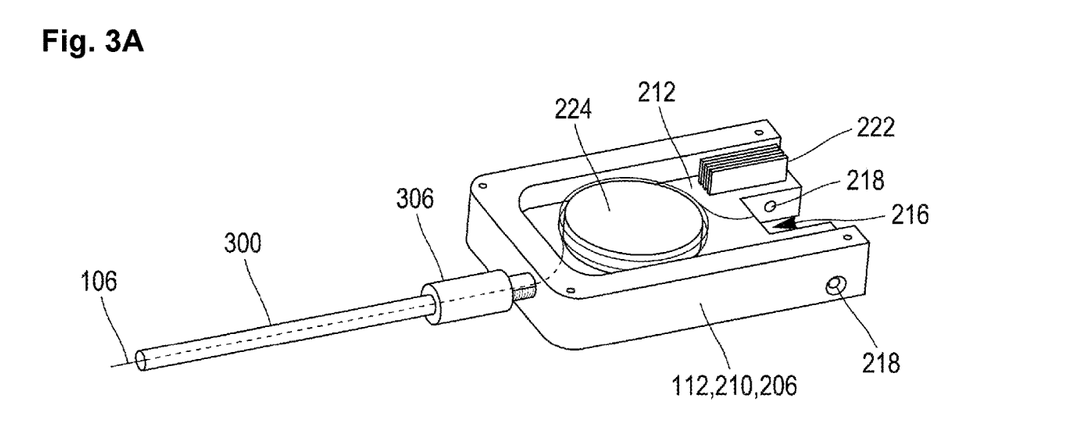
FIG. 3A, FIG. 3B, FIG. 3C and FIG. 3D schematically show a junction box according to the invention arranged to be clamped to an end of a section, such as at the end of a pipe portion. These Figures illustrate a method of an assembly of layers surrounding the optical fiber to a junction box according to the invention.
Figure 3B:
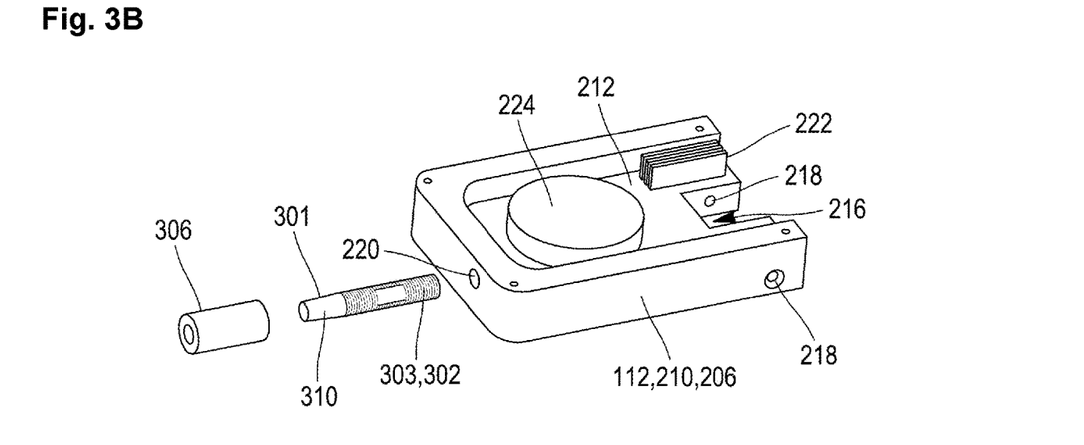
Figure 3C:
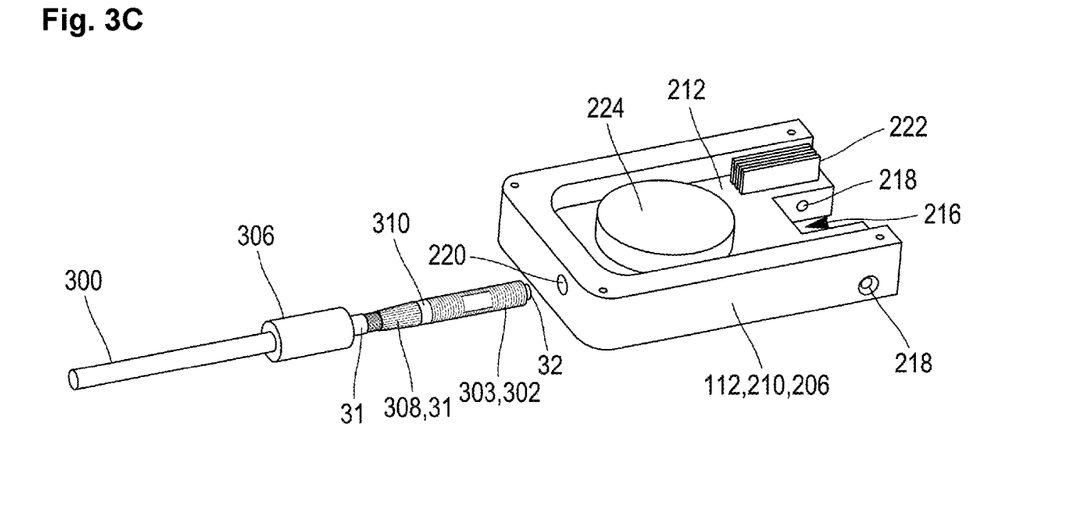

FIG. 3A schematically shows a junction box 112 according to the invention arranged to be clamped to an end of a section 101, such as at the end of a pipe portion.

The junction box 112 illustrated in FIG. 3A comprises all the elements of the junction box 112 shown in FIG. 2A and FIG. 2B.

In FIG. 3A to FIG. 3D, the junction box 112 comprises a part of the optical fiber 106 of a section 101. In that case, only the left end 108 of the optical fiber 106 and/or the right end 110 of the optical fiber 106 of a section 101 is illustrated.

The optical fiber 106 outside the junction box 112 is surrounded by layers 300. Those layers 300 comprise:
  at least one layer 31 surrounding the optical fiber 106 outside the junction box 112 but not inside this junction box 112, and/or
  at least one layer 32 surrounding the optical fiber 106 outside the junction box 112 and inside this junction box 112.

Over part of the layer 300, the layer 31 surrounds the layer 32.

The optical fiber 106 inside the junction box 112 is surrounded by less layer(s) than outside the junction box 112 or by other layer(s) than outside the junction box 112.

The at least one layer 32 comprises, from inside (more precisely from the optical fiber 106) towards outside of the cable 300 (more precisely towards outside the layer 32):
  a primary coating, typically a plastic coating surrounding the optical fiber 106. The primary coating fits into the junction box 112 and is winded with the optical fiber 106 around the part 224, and
  a metallic loose tube (stainless steel) in which we have a few fibers and some gel. It means that the optical fiber 106 and the metallic tube make a Fiber in Metal Tube (FIMT). The loose tube fits into the junction box 112 at the level of the second hole 220 but it is not winded inside the junction box 112.

Then, the at least one layer 31 comprises, from inside (more precisely from the layer 32) towards outside the cable 300 (towards outside the layer 31):
  a stand armor 308 or stainless-steel wires 308 (metal wires stranded around the tube) around the metal tube of the layer 32, and
  then an optical cable outer sheath, typically made of acrylate or of polymer (Polyethylene (PE), Polypropylene (PP), Polyvinyl chloride (PVC) etc.) layer as outer sheath.

The at least one layer 31 surrounding the optical fiber 106 outside the junction box 112 but not inside the junction box 112, is connected both to the junction box 112 and to the respectively the left end 102 or right end 104 of the section 101.

The at least one layer 31 is secured to the junction box 112 via a decoupling means. Specifically, the layer 31 is fixed to the junction box 112 via a decoupling means and a connection means 306 disclosed below.

Figure 8A:
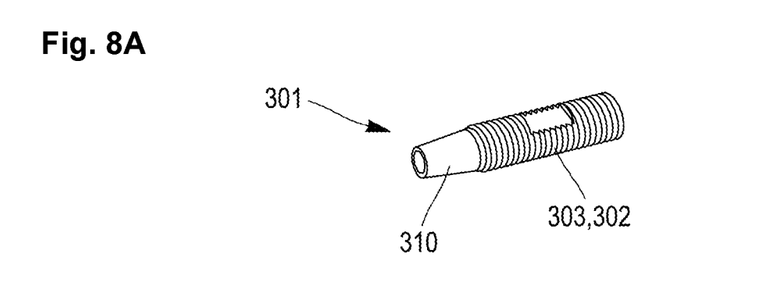
FIG. 8A and FIG. 8B illustrate a decoupling structure according to the invention.
Figure 8B:
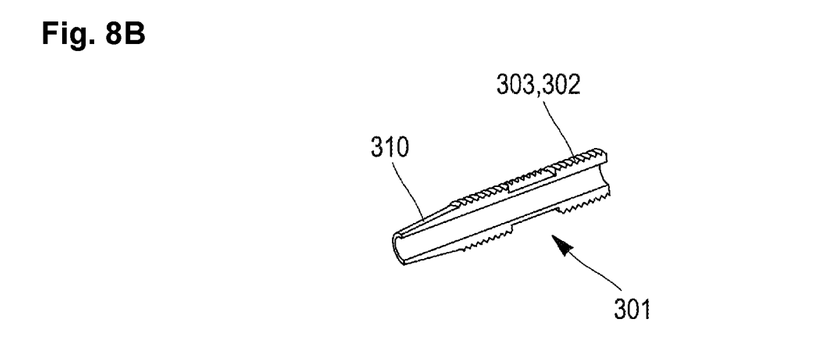

The decoupling means according to the invention comprises the elements illustrated in FIG. 8A, FIG. 8B, FIG. 9 and FIG. 10. Specifically, FIG. 8B is a cross-sectional view of a part of the decoupling means illustrated in FIG. 8A.

The section 101 comprises, for each junction box 112, the decoupling means arranged to decouple pulling force on the assembly of the elongated structure of this section 101 and on the junction box 112 from the optical fiber 106.

The decoupling means comprises a decoupling structure 301 comprising at least one tube-shaped part 303, preferably one metallic tube-shaped part 303, and means for screwing 302 the decoupling structure 301 to the junction box 112.

The decoupling structure 301 comprises an end 310 arranged to be assembled with a connection means 306. The end 310 of the decoupling structure 301 is, for example, conical.

The decoupling structure 301 is positioned between:
  the at least one layer 31 surrounding the optical fiber 106 outside the junction box 112, and
  the optical fiber 106, typically, the decoupling structure 301 is positioned between the two layers 31 and 32.
so that:
  the decoupling structure 301 is surrounded by the at least one layer 31 surrounding the optical fiber 106 outside the junction box 112, and
  the optical fiber 106 is surrounded by the decoupling structure 301.

Figure 9:
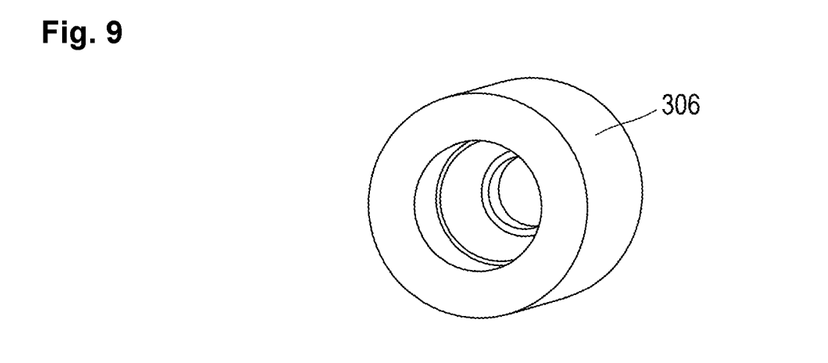
FIG. 9 and FIG. 10 illustrate a connection means according to the invention.
Figure 10:
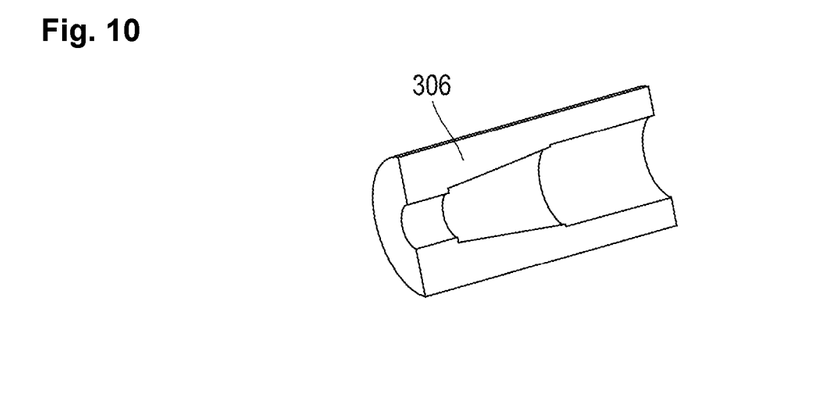

The decoupling means further comprises the connection means 306, for example a nut 306, surrounding at least one part of the decoupling structure 301 and the at least one layer 31 surrounding the optical fiber 106 outside the junction box 112.

The connection means 306 according to the invention is illustrated in FIG. 9 and in FIG. 10. Specifically, FIG. 10 is a cross-sectional view of the connection means 306 illustrated in FIG. 9.

An inner part of the connection means 306 is arranged to surround a part of an outer side of the decoupling means.

The connection means 306 is fixed on the decoupling structure 301 thanks to the means for screwing 302. The connection means 306 is arranged to grip the at least one layer 31 on the decoupling structure 301.

The at least one layer 31 surrounding the optical fiber 106 outside the junction box 112 is connected and integrated with the junction box 112 thanks to the decoupling means.

Figure 3D:
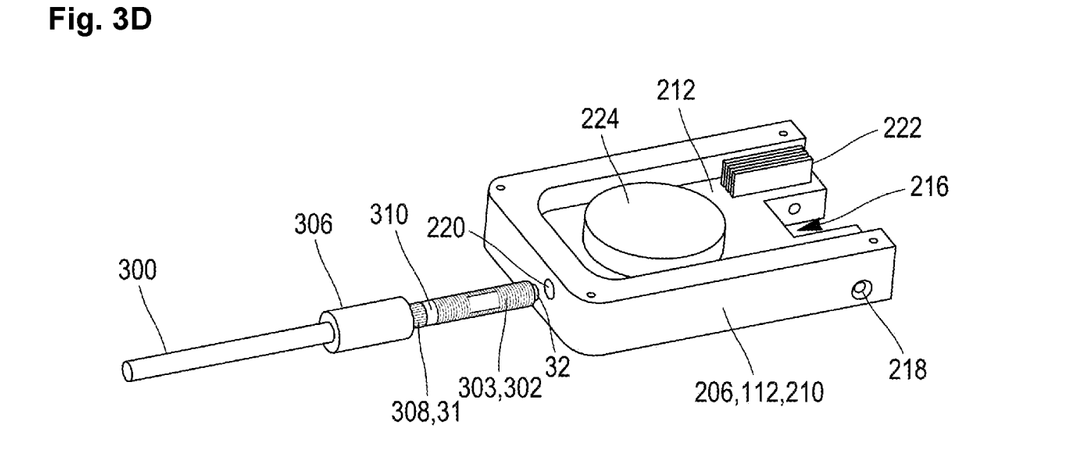

In FIG. 3D, the end 310 of the decoupling structure 301 is surrounded by the stand armor 308 of the at least one layer 31. The connection means 306 grips the plastic material 308 or the stand armor 308 around the end 310 of the decoupling structure 301.

The metallic tube of the at least one layer 32 passes both inside the connection means 306 and the decoupling structure 301, and, is inserted into the junction box 112 by the second hole 220.

The metallic tube of the at least one layer 32 always surrounds the optical fiber 106.

FIG. 3D shows that the optical fiber 106 passes inside the layers 300, the connection means 306, the decoupling structure 301 and is inserted into the junction box 112 by the second hole 220.

The means for screwing 302 of the decoupling structure 301 are of same diameter of the second hole 220 of the junction box 112.

The metallic tube of the at least one layer 32 passes inside the second hole 220 but it does not extend inside the junction box 112, for example in the inner part 212 of the stand 206.

We are now going to describe a use of a removable cover 402 or plug 402, in reference to with FIG. 4, FIG. 5, FIG. 6A and FIG. 6B, arranged to be fixed to the junction box 112 in order to close the junction box 112.

FIG. 4 shows a junction box 112 according to the invention with a removable cover 402 or plug 402 before being assembled with another junction box 112 according to the invention.

The removable cover 402 or plug 402 is arranged to be fixed to the outer part 210 of the stand 206 before the assembly of the two junction boxes 112.

The removable cover 402 or plug 402 protects the junction box 112 from the outside of the junction box 112. For example, the removable cover or plug 402 protects the inside of the junction box 112 from the dust or from damages caused by the external environment surrounding the junction box 112.

The removable cover 402 or plug 402 is made of rugged material such as stainless steel, or aluminum or even polymer.

The removable cover 402 is made of the same material than the junction box 112, or with Polypropylene (PP) or Polyvinyl chloride (PVC).

Figure 5:
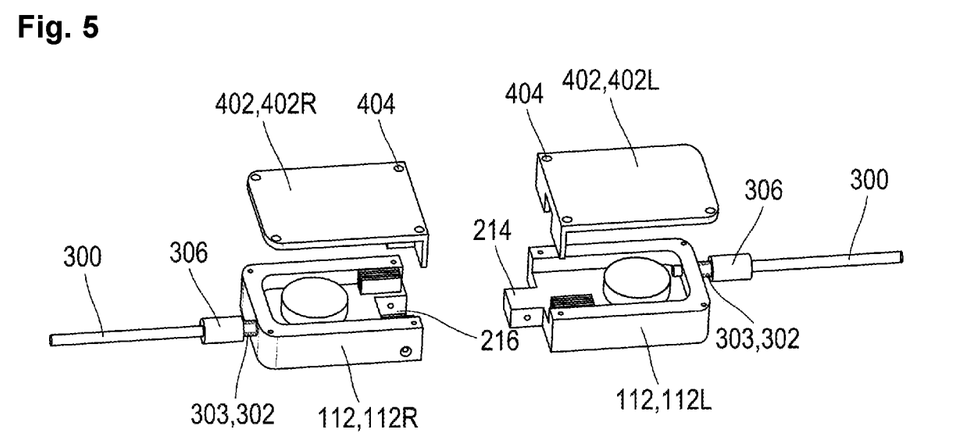
FIG. 5 shows two junction boxes according to the invention with their removable cover or plug before the assembly of two junction boxes according to the invention.

As shown in FIG. 5, a removable cover 402 or plug 402 is positioned on and/or fixed to each junction box 112.

The removable cover 402 or plug 402 is arranged to close or seal the inside of the junction box 112.

For example, the removable cover 402 is used so as to isolate the inside of the junction box 112 containing the optical fiber 106 from the outside of the junction box 112.

In addition, the removable cover 402 or plug 402 is arranged to be removed before assembling two junction boxes $112_L$, $112_R$ together.

Figure 6A:
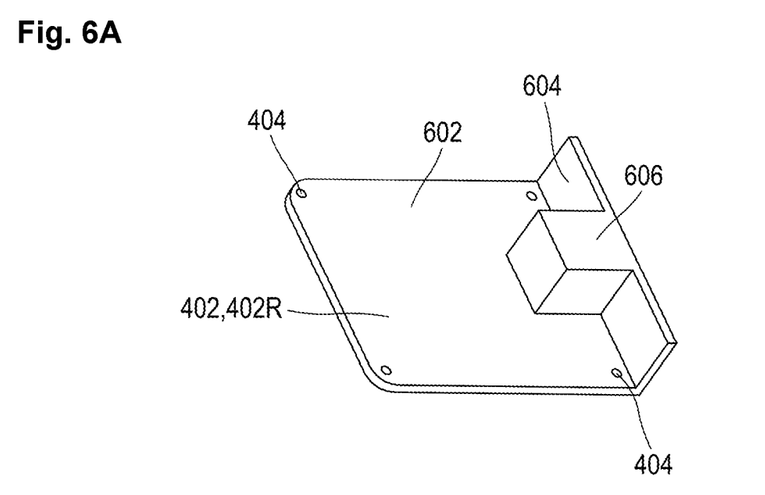
FIG. 6A and FIG. 6B are an example of removable covers or plugs of each of the two junction boxes according to the invention.
Figure 6B:
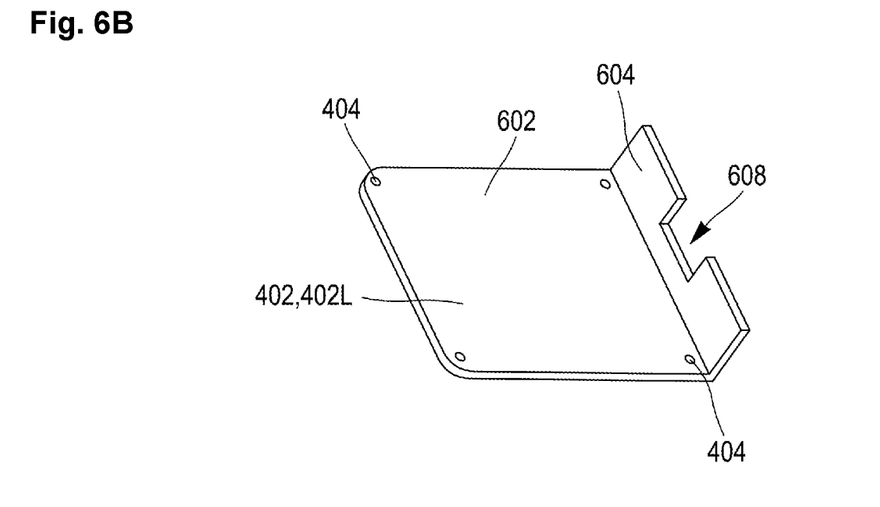

As shown in FIGS. 6A and 6B, the removable cover 402 comprises a first flat part 602 arranged to be placed above the stand 206.

The removable cover 402 further comprises a second part 604 positioned perpendicularly to the first part 602.

The geometry of the removable cover 402 depends on and/or is adapted to the junction box 112.

On the one hand, if the junction box 112 comprises a first cavity 216, as shown in FIG. 5, the second part 604 of the removable cover 402 comprises a second protrusion 606 arranged to be assembled in the first cavity 216 when the removable cover 402 is placed above the stand 206 of the junction box 112.

The second protrusion 606 is of same dimension and same geometry of the first cavity 216.

On the other hand, if the junction box 112 comprises a first protrusion 214, as shown in FIG. 5, the second part 604 of the removable cover 402 comprises a second cavity 608 arranged to be positioned above the first protrusion 214 when the removable cover 402 is placed above the stand 206 of the junction box 112.

In that case, the removable cover 402, comprising the second cavity 608, does not cover the first protrusion 214 of the junction box 112. The first protrusion 214 of the junction box 112 exceeds of the ensemble formed by the junction box 112 and the removable cover 402.

The removable cover is relatively thin. For example, the removable cover 402 has a thickness about 2 mm.

The removable cover 402 comprises at least one third hole 404 arranged to fix the removable cover 402 above the stand 206 of the junction box 112 by fixing means (not illustrated).

In a variant, not shown, the removable cover 402 can be directly fastened to the junction box 112 by interlocking or by other mechanical process or mechanical fastening, which do not require the use of holes (i.e. the third hole 404).

We are now going to describe the assembly of two junction boxes 112 according to the invention in reference to FIG. 7A and FIG. 7B.

In addition, FIG. 7A and FIG. 7B disclose a use of a protection cover 702 arranged to be fixed to two assembled junction boxes $112_L$, $112_R$ in order to close the two assembled junction boxes $112_L$, $112_R$.

In FIG. 7A, the removable cover 402 of each junction boxes 112 arranged to be assembled is removed from these two junction boxes 112 in order to allow its assembly.

The junction boxes $112_L$, $112_R$ are prepared in advance before assembling the two junction boxes $112_L$, $112_R$. It means that, for example, the ends of each optical fiber 106 arranged to be assembled with another optical fiber 106 of another junction box 112 are already naked. The Fiber cladding has been removed over a length sufficient to allow for cleaving (naked).

The decoupling means is installed so as to fix the at least one layer 31 to each junction box 112 arranged to be assembled with another junction box 112.

The two removable covers 402 of the two junction boxes $112_L$, $112_R$ are simply removed to assemble two junction boxes $112_L$, $112_R$ together.

In FIG. 7A, the two junction boxes $112_L$, $112_R$ are assembled.

The two assembled junction boxes $112_L$, $112_R$ form a single final box.

The optical fibers 106 of each junction box 112 are spliced together, protected by a part made of polymer and positioned in a comb 222 of one of the two assembled junction boxes $112_L$, $112_R$.

In FIG. 7B, the two assembled junction boxes 112 are covered by the protection cover 702 positioned above the two assembled junction boxes $112_L$, $112_R$.

The protection cover 702 and the two assembled junction boxes $112_L$, $112_R$ are of same size.

It means that the length L3 of the protection cover 702 is equal to the addition of the lengths L1 and L2 of the junction boxes $112_R$ and $112_L$.

The width w3 of the protection cover 702 is of same width of the junction boxes $112_L$ and $112_R$.

In addition, the protection cover 702 is fixed to the two assembled junction boxes $112_L$, $112_R$ with securing means (not show).

The third holes 404 used to fix the removable cover 402 are the same as those used to fix the protection cover 702 above the two assembled junction boxes $112_L$, $112_R$.

The protection cover 702 is arranged to close or seal the inside of the two assembled junction boxes $112_L$, $112_R$ from the outside of the two assembled junction boxes $112_L$, $112_R$.

The protection cover 702 covers and protects from the outside of the protection cover 702 (especially against dust or from water or from damages caused by the external environment surrounding the two assembled junction boxes $112_L$, $112_R$) the different elements positioned inside the two assembled junction boxes $112_L$, $112_R$.

It means that the protection cover 702 offers mechanical protection from impact or etc.

The protection cover 702 is made of the same material than the two assembled junction boxes 112.

The protection cover 702 is relatively thin. For example, the protection cover 702 has a thickness about 2 mm.

Figure 11:
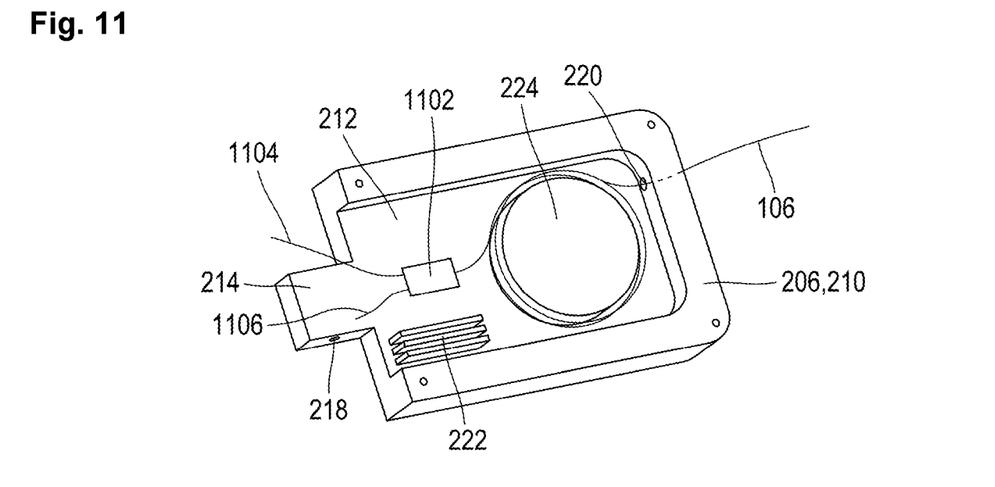
FIG. 11 illustrates a junction box according to the invention equipped with a connecting coupler connected with an optical fiber.

We are now going to describe a junction box 112 according to the invention equipped with a connecting coupler connected with the optical fiber 106, in reference to with FIG. 11.

In FIG. 11, a wavelength division multiplexing coupler 1102 separates at least one end of the optical fiber 106 in two channels 1106, 1104 by a coupler 1102, preferably.

In a variant (not shown), at least one end of the optical fiber 106 is equipped with an optical connector. In that case, the two optical fibers 106 of two junction boxes $112_L$, $112_R$ arranged to be assembled together are not spliced but joined together by the use of the connector (not shown).

The channel 1106 or 1104 of a junction box 112 positioned at an end of a section 101 is used to measure the splice of two assembled junction boxes $112_L$, $112_R$, terminated (i.e. assembled) but yet without protection cover 702, positioned at the other end of the same section 101.

We are now going to describe a process of an assembly of a plurality of sections 101 according to the invention in reference to FIG. 1 FIG. 3A, FIG. 3B, FIG. 3C, and FIG. 3D, FIG. 4, FIG. 5, FIG. 7A and FIG. 7D.

Before being in the field, the process according to the invention comprises an assembling phase. The assembling phase comprises, for any section 101:
  receiving the section 101 with its cable 300 surrounding the optical fiber 106,
  inserting the optical fiber 106 and the at least one layer 32 surrounding the optical fiber 106 inside the junction box 112 at each end of the section 101, and
  fastening the at least one layer 31 surrounding the optical fiber 106 outside the junction box 112 with the decoupling structure 301 and the connection means 306.

For example, in the case of the section $101_2$, it means that the assembling phase comprises assembling a junction box $112_L$ or $112_R$ at the level of each end 102 and 104 of the section $101_2$. Thus, the cable 300 connects the section $101_2$ with each junction box 112 positioned at the level of the end 102 or 104 of the section $101_2$.

In addition, the junction box 112 can be prepared during the assembling phase. It means that the different elements inside the junction box 112 can be ready to be assembled with elements coming from another junction box 112 (of another section, for example from section $101_1$ or section $101_3$) arranged to be assembled with the junction box 112 of the section $101_2$. For example, each end of the optical fiber 106 inside the junction box 112 can be already naked.

The removal cover 402 is used to protect the different elements inside the junction box 112 from the outside.

In the field, the process according to the invention comprises the following steps:
  connecting the left end 102 of elongated structure of the second section $101_2$ to the right end 104 of the elongated structure of the first section $101_1$.

In addition, the process comprises removing the removable cover 402 or plug 402 positioned on each junction box $112_R$, $112_L$ before connecting or assembling the two junction boxes $112_R$, $112_L$ together.

Then, the process according to the invention comprises:
  connecting or assembling the junction box $112_L$ enclosing the left end 108 of the optical fiber 106 of the second section $101_2$ to the junction box $112_R$ enclosing the right end 110 of another optical fiber 106 of the first section $101_1$ so as to form two assembled junction boxes $112_L$, $112_R$.

The process according to the invention further comprises fixing the two assembled junction boxes $112_L$, $112_R$ with securing means (not shown).

The process according to the invention comprises further connecting together, inside the two assembled junction boxes $112_R$, $112_L$, the two ends of two optical fibers 106 of two connected sections $101_1$, $101_2$. This step is carried out by splicing.

For example, in the field (i.e. when the two junction boxes $112_R$, $112_L$ are assembled together), the cladding of the optical fibers 106 does not need to be removed because it is already been done in the upstream phase, for example during a conception or assembling phase of the junction box 112. This conception or assembling phase allows saving time so that the assembling of two junction boxes $112_R$, $112_L$ is not time consuming.

In a variant of the process according to the invention, the end of the optical fiber 106 inside the junction box 112 is naked in the field instead of during the assembling phase.

In a variant of the process according to the invention, the process according to the invention comprises connecting an optical connector (not shown) to at least one free end of the optical fiber 106 of the second section $101_2$ or of the first section $101_1$ comprised in an unassembled junction box 112 to another junction box 112. This variant of process according to the invention is only used when the two ends of optical fibers 106 are not spliced.

When the two junction boxes $112_L$, $112_R$ are fixed together, the process according to the invention comprises:
  controlling the optical connection between the two optical fibers 106 connected inside the two assembled junction boxes $112_R$, $112_L$ by connecting an optical control means to the free end of the optical fiber 106 of the second section $101_2$ or of the first section $101_1$ comprised in an unassembled junction box 112 to another junction box 112.

For example, the control of the splicing of two optical fibers 106 in two assembled junction boxes $112_L$, $112_R$ positioned at the junction between the right end 104 of the first section $101_1$ and the left end 102 of the second section $101_2$ is carried out:
  either at the free end of the optical fiber 106 of the junction box $112_L$ of the first section $101_1$
  or at the free end of the optical fiber 106 of the junction box $112_R$ of the second section $101_2$.

It means that the process according to the invention comprises controlling the connection of the left end 108 of the optical fiber 106 of a second section $101_2$ with the right end 110 of the optical fiber 106 of another section $101_3$ positioned in the side of the right end of the second section $101_2$.

Another example of controlling the optical connection between two optical fibers 106 spliced together in two assembled junction boxes $112_L$, $112_R$ may be the following.

If the optical fibers 106 inside two assembled junction boxes $112_L$, $112_R$ are not spliced yet, the process according to the invention comprises:
  connecting a coupler 1102 to the left end 108 of the optical fiber 106 of the second section $101_2$ or to the right end 110 of the optical fiber 106 of the first section $101_1$ in order to separate the ends 108, 110 of this separated optical fiber 106 in first and second channels 1104, 1106 of the section 101; connecting an optical control means (not shown) to the first channel 1104 of the separated fiber 106, and, in a same time, connecting the second channel 1106 of the separated fiber 106 to an end of the other optical fiber 106.

The channels 1104 and 1106 are optical fibers.

In this example above, the coupler should be made during the assembling phase of the junction box 112 (i.e. before the assembling of two junction boxes $112_L$, $112_R$ in the field). Thus, the method starts with an upstream preparation of a Wavelength Division Multiplexing (WDM) coupler 1102 (both channels). The coupler 1102 is prepared (i.e. ready for use), integrated and protected inside the junction box 112 covered with the removable cover 402. In the field (i.e. where the two junction $112_L$, $112_R$ boxes are assembled), the channel 1106 of one of junction box 112 is spliced with an optical fiber 106 or another channel 1106 of another junction box 112. Then, the channel 1104 of one of the two assembled junction boxes 112$_L$, 112$_R$ (comprising the coupler 1102) is used to measure the splice of two channels 1106/1106 or 1106/106 belonging to two others assembled junction boxes 112$_L$, 112$_R$. Said two other assembled junction boxes 112$_L$, 112$_R$ can be positioned downstream or upstream of the channel 1104 connected to the optical control means.

As in the first example of controlling, this second example allows controlling the connection of two optical fibers 106 of two assembled junction boxes 112$_L$, 112$_R$ positioned at the level of a section 101 before or after the section 101 wherein the coupler 1102 is used to separate an optical fiber 106 in two channels 1104, 1106.

In this second example, the control of the connection of two optical fibers 106 is carried out at the level of the channel 1104 before closing the protection cover 702 above the two assembled junction boxes 112$_L$, 112$_R$.

Theses controls allow verifying the optical connection between two optical fibers 106 assembled together by splicing or by the use of a connector.

It means that, some steps of the process, for example the preparation of the WDM coupler, are made upstream (i.e. not in the field where the two junction boxes 112$_L$, 112$_R$ are assembled). The upstream preparation of the WDM coupler allows saving time because in the field, just the assembly of two junction boxes, the splice of two optical fibers 106, the closing of two assembled junction boxes 112$_L$, 112$_R$ with the protection cover 702, the step of controlling the splice and the closing with the protection housing 114 have to be made.

In addition, these previous steps can be carried out at the same time, simultaneously, allowing obtaining a control that is not time consuming.

By that way, we can control the optical connection of two optical fibers assembled together at the level of two assembled junction boxes 112$_L$, 112$_R$ either upstream or downstream of the junction box 112 to which the optical control means is connected.

It means that someone can check the splice of the next section 101 while someone else is working on assembling the two junction boxes 112$_L$, 112$_R$ from which the measurement is made. Thus, the process is optimized in order to save time.

The optical control means is for example an Optical Time Domain Reflectometer (ODTR).

The process according to the invention further comprises positioning and fixing, by securing means, a protection cover 702 on the two assembled junction boxes 112, 112.

When the protection cover 702 is put and secured to the two assembled junction boxes 112$_L$, 112$_R$, the process according to the invention further comprises positioning a protection housing 114. The protection housing 114 allows covering and insulating from the outside of the protection housing 114:
the entire connection of the two connected ends 102, 104 of the connected sections 101$_1$ and
the two assembled junction boxes 112$_L$, 112$_R$ at the junction of the section 101$_1$ and 101$_2$.

The process according to the invention comprises fixing a left end 116 of the protection housing 114 at a right side of the first section 101$_1$ of the assembly 100, and fixing a right end 118 of the protection housing 114 at a left side of the second section 101$_2$ of the assembly 100.

Of course, the invention is not limited to the examples, which have just been described, and numerous amendments can be made to these examples without exceeding the scope of the invention.

Of course, the different characteristics, forms, variants and embodiments of the invention can be combined with each other in various combinations to the extent that they are not incompatible or mutually exclusive. In particular, all variants and embodiments described above can be combined with each other.

The invention claimed is:

1. A section for an assembly, said assembly being arranged to be assembled by a plurality of sections put together, wherein said section comprises:
an elongated structure having a left end and a right end;
an optical fiber, said optical fiber having a left end and a right end and extending from its left end to its right end in such a way that:
the left end of the elongated structure and the left end of the optical fiber are located on the same left side of the section; and
the right end of the elongated structure and the right end of the optical fiber are located on the same right side of the section;
each end of the optical fiber is enclosed in a junction box, the junction box of the respectively right end or left end of the optical fiber of said section being arranged to be assembled with the junction box of the respectively left end or right end of the optical fiber of another similar section in order to allow an optical connection between the optical fibers of two sections; the left end of the elongated structure being arranged to be connected and locked with the right end of another elongated structure of the other similar section.

2. The section according to claim 1, wherein, on the left end of the optical fiber and/or on the right end of the optical fiber, the optical fiber inside the junction box is surrounded by less layer(s) than outside the junction box or by other layer(s) than outside the junction box.

3. The section according to claim 1, wherein, on the left end of the optical fiber and/or on the right end of the optical fiber, the at least one layer, surrounding the optical fiber outside the junction box but not inside the junction box is connected both to the junction box and to the respectively the left end or right end of the section.

4. The section according to claim 1, wherein the junction box of the respectively right end or left end of the optical fiber is arranged to be connected and locked to a junction box of the respectively right end or left end of the optical fiber of the other similar section of an assembly.

5. The section according to claim 1, wherein the section comprises, for each junction box, a decoupling means arranged to decouple pulling force on the assembly of the elongated structure of this section and on the junction box from the optical fiber.

6. The section according to claim 5, wherein at least one layer surrounding the optical fiber outside the junction box but not inside the junction box is connected and integrated with the junction box thanks to the decoupling means.

7. The section according to claim 6, wherein the decoupling means comprises:
a decoupling structure comprising at least one tube-shaped part and means for screwing the decoupling structure to the junction box, the decoupling structure being positioned between:

the at least one layer surrounding the optical fiber outside the junction box but not inside the junction box; and the optical fiber so that:

the decoupling structure is surrounded by the at least one layer surrounding the optical fiber outside the junction box but not inside the junction box; and the optical fiber is surrounded by the decoupling structure; and connection means surrounding at least one part of the decoupling structure and the at least one layer surrounding the optical fiber outside the junction box but not inside the junction box, the connection means being fixed on the decoupling structure thanks to the means for screwing, the connection means being arranged to grip, on the decoupling structure, the at least one layer surrounding the optical fiber outside the junction box but not inside the junction box.

8. The section according to claim 1, wherein at least one end of the optical fiber:

is equipped with an optical connector; and/or is separated in two channels by a coupler.

9. The section according to claim 1, wherein a removable cover or plug is positioned on each junction box and fixed to its junction box, said removable cover or plug being arranged to close or seal the inside of the junction box in order to isolate the inside of the junction box containing the optical fiber from the outside of the junction box and/or to protect the inside of the junction box from the dust or from damages caused by the external environment surrounding the junction box, the removable cover or plug being arranged to be removed before assembling two junction boxes together, each end of the optical fiber inside the corresponding junction box being already naked.

10. An assembly comprising a plurality of assembled sections according to claim 1.

11. The assembly according to claim 10, wherein two assembled junction boxes are:

covered by a protection cover positioned above the two assembled junction boxes; and fixed to the protection cover;

said protection cover being arranged to close or sealing the inside of the two assembled junction boxes from the outside of the two assembled junction boxes.

12. The assembly according to claim 10, wherein two assembled junction boxes, placed at a connection of a first said section and a second said section, are covered by a protection housing covering and insulating from the outside of the protection housing:

the entire connection of two connected ends of the connected sections; and the two assembled junction boxes;

said protection housing comprising a top portion and a bottom portion, said top and bottom portions comprising:

a left end fixed at a right side of the first section of the assembly; and a right end fixed at a left side of the second section of the assembly.

13. A process of assembling a plurality of sections according to claim 1, comprising the following steps:

connecting the left end of elongated structure of a second section to the right end of the elongated structure of a first section; and connecting or assembling the junction box enclosing the left end of the optical fiber of the second section to the junction box enclosing the right end of another optical fiber of the first section so as to form two assembled junction boxes.

14. The process according to claim 13, wherein the process comprises:

fixing the two assembled junction boxes with securing means.

15. The process according to claim 13, wherein the process comprises:

removing the removable cover or plug positioned on each junction box before connecting or assembling the two junction boxes together.

16. The process according to claim 13, wherein the process comprises:

connecting together, inside the two assembled junction boxes, the two ends of the two optical fibers of two connected sections.

17. The process according to claim 16, wherein:

connecting together, by splicing inside the two assembled junction boxes, the two ends of two optical fibers of two connected sections, or connecting an optical connector to at least one free end of the optical fiber of the first section or of the second section comprised in an unassembled junction box to another junction box.

18. The process according to claim 13, wherein it comprises:

controlling the optical connection between two optical fibers connected inside two assembled junction boxes by connecting an optical control means to the free end of the optical fiber of the first section or of the second section comprised in an unassembled junction box to another junction box.

19. The process according to claim 13, wherein it comprises:

connecting a coupler to the left end of the optical fiber of the second section or to the right end of the optical fiber of the first section in order to separate the end of this separated optical fiber in first and second channels; connecting an optical control means to the first channel of the separated fiber; and connecting the second channel of the separated fiber to an end of the other optical fiber.

20. The process according to claim 13, wherein the process further comprises:

positioning and fixing, by securing means, a protection cover on the two assembled junction boxes.

21. The process according to claim 13, wherein the process further comprises:

positioning a protection housing, in order to cover and insulate from the outside of the protection housing:

the entire connection of the two connected ends of the connected sections; and the two assembled junction boxes, fixing a left end of the protection housing at a right side of the first section of the assembly; and fixing a right end of the protection housing at a left side of the second section of the assembly.

* * * * *